Figure 1:
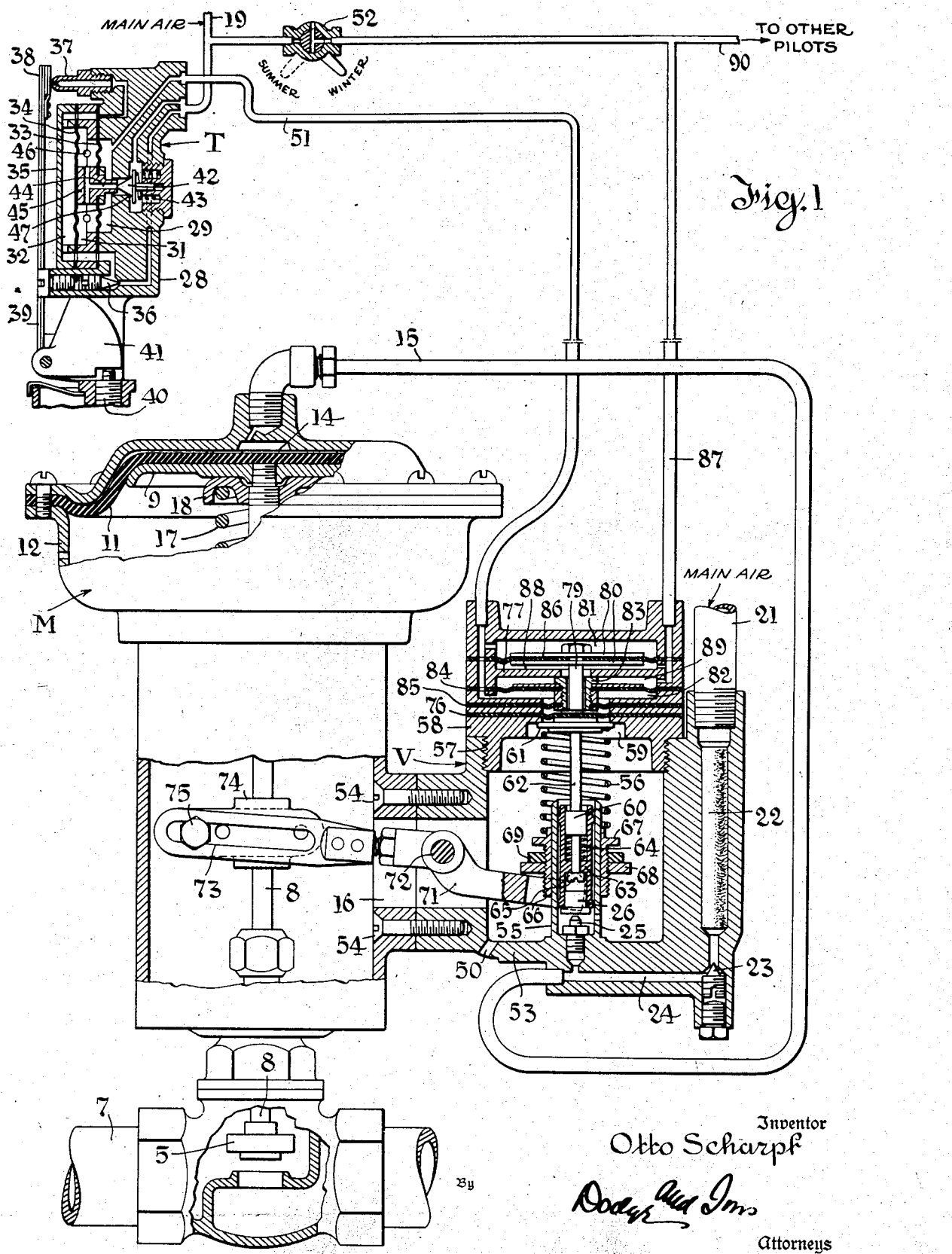

Feb. 3, 1942. O. SCHARPF 2,272,025
REGULATING SYSTEM
Filed July 31, 1940 2 Sheets-Sheet 1

Inventor
Otto Scharpf
By Dodge and Sons
Attorneys

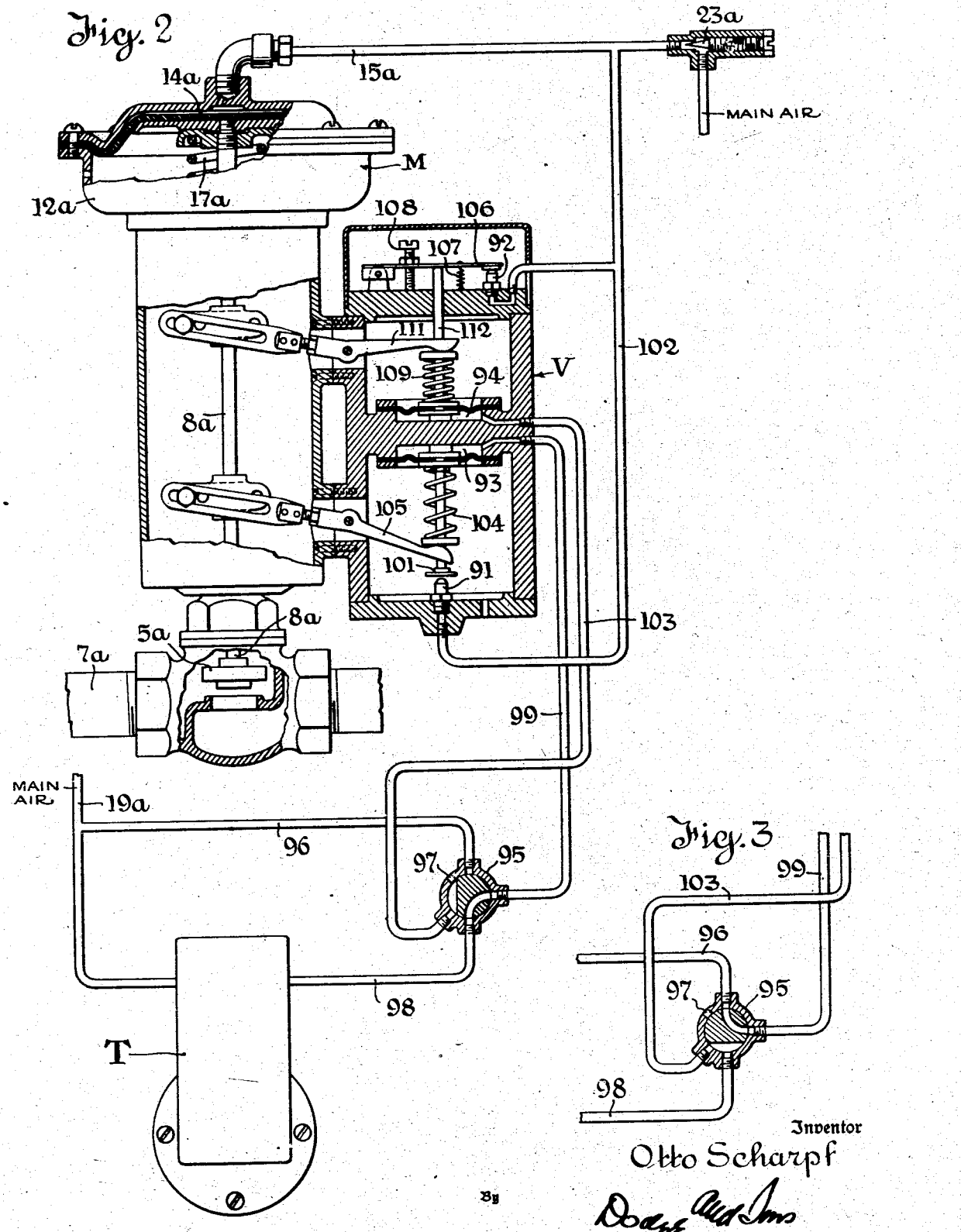

Patented Feb. 3, 1942

2,272,025

UNITED STATES PATENT OFFICE 2,272,025

REGULATING SYSTEM

Otto Scharpf, Milwaukee, Wis., assignor to Johnson Service Company, Milwaukee, Wis., a corporation of Wisconsin Application July 31, 1940, Serial No. 348,917

10 Claims. (Cl. 236—1)

This invention relates to regulating systems and especially to regulating systems of the pneumatic type. It is concerned with the control of such systems so as to permit different types of response without disturbing the adjustment or characteristics of a primary controlling instrument.

In the art of automatic temperature and humidity control, two classes of instruments are well known, namely, class 1 instruments in which branch line pressure increases with temperature increase, as in the control of a heating medium, and class 2 instruments in which the branch line pressure decreases as temperature increases, as in the control of a cooling medium. It is desirable in systems of the general type mentioned above to simplify the apparatus as much as possible, and particularly to provide means for changing from class 1 to class 2 or vice versa, without disturbing the adjustment of the temperature or other atmospheric condition responsive instrument.

It has been considered axiomatic in the art heretofore that change from one class of instrument to the other necessitated reversal of the operation of the atmospheric condition responsive instrument. Such reversal was objectionable because it necessitated changes in the setting of a delicate instrument and undue complication of the same. In a large system in which a thermostat or the like is located in each room, the problem becomes amplified. The present invention is concerned with means, entirely independent of the controlling instrument, for shifting from one class to the other, as in changing from a heating to a cooling cycle or vice versa, using a standard class 1 thermostat, humidostat, or the like.

Where a valve, a damper, or a similar means is employed to control the flow of a heating or a cooling medium, it is usual to bias the valve or the like in one direction by a spring and to move it positively in the other direction by pneumatic pressure subject to control by an atmospheric condition responsive instrument such as a thermostat. With such an arrangement the spring can be made to bias the valve or the like to either closed or open position, but it is impossible, with prior art apparatus, to change the direction of response of the valve without reversing the action of the thermostat.

The present invention provides means whereby a valve or the like for controlling the flow of a heat exchange medium may be caused upon increase in branch line pressure to move either in a direction opposed to its spring bias, or in the same direction as its spring bias. Accordingly, the main object of the present invention is to provide a pneumatic regulating system in which a pilot valve may be caused to operate at will as a class 1 or a class 2 instrument for controlling the supply of a heating or cooling medium while employing an ordinary non-reversible control instrument. A further object of the invention is to provide an arrangement in which a pressure operated pilot valve may be caused to respond to branch line pressure increase so as to actuate the heat exchange medium control in the same direction as that to which it is biased.

For purposes of illustration the invention has been described as applied to the pilot valve of a pneumatic system in which the valve for the control of heat exchange medium is moved in one direction by pressure built up in a diaphragm chamber, and in the opposite direction by an actuating spring. It is to be understood, however, that the invention is not limited to use with the particular mechanism shown.

In the drawings:

Figure 1 is a diagrammatic view with parts in section of a unitary system adapted to operate either as a class 1 or a class 2 instrument in response to a non-reversible thermostat, the parts being shown in position for class 1 operation;

Fig. 2 is a diagrammatic view partly in section of a system similar to that of Fig. 1 but using a modified pilot valve structure employing two leak ports, the control valve being positioned for class 1 operation; and Fig. 3 is a detail sectional view of the control valve of Fig. 2, showing the valve positioned for class 2 operation of the system.

The system illustrated in Fig. 1 comprises a pressure or diaphragm motor M for operating a valve to control flow of heat exchange medium, a control instrument T, and a pilot valve V for coordinating the operation of the motor and instrument.

The motor M comprises a casing 12 containing a diaphragm 11 and a diaphragm chamber 14 supplied with pressure fluid through line 15. Bearing against the diaphragm is a plate 9 supporting a valve stem 8 and a spring seat 18 carrying biasing spring 17. This spring opposes pressure in the diaphragm chamber to control movement of valve 5 in the medium supply line 7.

The control instrument T is a standard non-reversible thermostat of the type disclosed in Otto Patent 1,500,260. It comprises a body 28 containing three chambers 29, 31 and 32, formed by diaphragms 33 and 34 and cap 35. Main air from a supply line 19 (usually at 15 lbs. pressure) may be supplied to the small chamber 29 associated with small diaphragm 33, through a combined admission and exhaust valve 42, and also through a pin valve 36 to the chamber 32. Leak port 37 connected to chamber 32 is controlled by lid 38 in response to bi-metallic member 39 adjustably supported by the usual pivoted, weighted saddle 41 and adjusting screw structure 40. Combined admission and exhaust valve 42 is biased to the left by a spring 43 and may engage a seat 47 to control pressure in chamber 29. Valve 42 also cooperates with an opening 44 in a hub 45 connecting the two diaphragms 34 and 33 to control the pressure in chamber 29. The chamber 31 between the two diaphragms is vented to atmosphere as at 46. When pressure from pipe 19 is supplied to the thermostat, the pressure built up in chamber 32 is determined by the position of leak port lid 38.

When the lid 38 closes leak port 37, pressure builds up in chamber 32, and diaphragm 34 moves to the right closing the exhaust duct 44 by engaging the valve 42 and moving this valve away from seat 47. Therefore, main line pressure enters chamber 29 and is fed to branch line 51. When, however, lid 38 opens port 37 and vents the chamber 32, spring 43 moves the valve 42 to seating position at 47 so that pressure in chamber 29 is dissipated through duct 44 and vents 46 in chamber 31. The net result of this arrangement is to cause pressure variations in chamber 29, and hence in branch pipe 51, in response to variations in the position of thermostat 39 controlling leak port lid 38.

In the usual arrangement of a class 1 instrument, temperature increase produces an increase in branch line pressure to reduce the rate of flow of heating medium or increase the rate of flow of cooling medium. For reversible control, two thermostats reversely arranged were required, or if a single thermostat be used its action must be reversible. The present arrangement makes it possible to reverse the control at will using a single non-reversible thermostat. It involves the use of a reversible pilot valve, such as valve V, which will now be described.

This valve comprises a hollow body 53 attached to casing 12 at 54. This body houses the pilot valve mechanism consisting of a leak port, diaphragm means for controlling the leak port, means permitting reversal of the operating characteristics of the valve, and follow-up mechanism for coordinating the movements of the valve 5 and the leak port control. Considered in detail, the floor of the body 53 contains a duct 24 forming a continuation of pipe 15 and supplied from main air line 21 through filter 22 and pin valve 23. A leak port 25 in the floor of chamber 53 controls pressure discharge from duct 24. Upstanding from the floor of body 53 and surrounding the leak port 25 is a guide tube 55 for leak valve 26. This valve is adapted to be moved with reference to leak port 25 by certain diaphragm structure about to be described. The chamber surrounding the leak port is vented to atmosphere at 50.

The cap 58 carries a set of spacer discs with intervening diaphragms, as shown in the drawings. These form a housing which is chambered to receive two main diaphragms 84 and 86 arranged selectively to control the leak port 25 for class 1 or class 2 operation. A small diaphragm 76 is used to avoid the use of a packing gland and engages head 61 on stem 62 (hereinafter described). A second small diaphragm 85 is attached to the center of main diaphragm 84 by a ported hub 83, forming a differential diaphragm chamber 82 in which rising pressure urges the diaphragm assembly, and consequently the hub 83, upward. Chamber 81 formed above diaphragm 86 and chamber 82 are both connected to branch line 51. Rising pressure in chamber 81 urges diaphragm 86 downward. Thus the two diaphragm units operate in reverse directions in response to the same change of branch line pressure. A valve operating rod 79 is attached to upper diaphragm 86 and is freely movable through hub 83 to engage diaphragm 76 and thus react on head 61. Chambers 88 and 89 formed between the main diaphragms 84 and 86 and connected at all times through the opening in partition 77 are both connected to line 87. Line 87 is connected by a valve 52 either to main line 19 or to atmosphere. Main line pressure is always higher and atmospheric pressure always lower than pressure in branch line 51 and thus is always effective in chambers 81 and 82. Hence when valve 52 is in venting position, hub 83 is forced upward to an inactive position and diaphragm 86 takes control, giving class 1 response, whereas when valve 52 is set to admit main line pressure diaphragm 86 is forced upward to inactive position and diaphragm 84 takes control through reaction of hub 83 downward upon diaphragm 76 and head 61.

The cap 58, which carries the above described diaphragm assembly, is threaded into the body 53 at 57. The cap 58 is recessed on its lower side as indicated at 59 to define the upper position of the head 61 on valve operating stem 62. The head 61 acts also as a seat for the upper end of the loading spring 56. The valve 26 previously described is mounted in the lower end of a tubular member 63 axially alined with the stem 62 and guided within tubular guide 55. The stem 62 carries a head 60 which is slidable in the upper end of the tubular member and which reacts downward upon the tubular member through a spring 64. Separation of the parts is prevented by a screw 65 which is threaded into the member 60 and whose head acts as a limit stop to limit the separating movement of the tubular member and the stem 62. Thus the spring 64 limits the force with which the valve 26 may be seated and the screw 65 assures precise timing of the opening movement of the valve 26.

Slidably mounted on the exterior of the tubular guide 55 is a sleeve 66 having a flange 67 which serves as a lower seat for loading spring 56. Sleeve 66 is externally threaded to receive a stop-ring 68 with cooperating locking ring 69. The stop-ring 68 is in operative engagement with the forked ends of a lever 71 extending through opening 16 in casing 12. This lever is pivoted at 72 and adjustably connected through a pin-and-slot connection 73 with a block 74 carried by the valve stem 8. Adjustment of screw 75 by placing it in different openings in block 74 makes it possible to vary the motion ratio between the movements of valve stem 8 and the stop ring 68. Hence the loading exerted by spring 56 is determined by the position of valve 5.

In describing the operation of the mechanism disclosed it will first be pointed out how operation takes place during the heating cycle (class 1 operation), that is, with the valve 52 in its full line or "Winter" position venting line 87 and chambers 88 and 89 to atmosphere. It will be assumed that main air pressure, of fifteen pounds per square inch, is supplied to pipe 19, and that ambient temperature conditions are such that line 51 is vented and valve 5 opened. If temperature conditions change to cause a rise in pressure in branch line 51, valve 5 will be closed gradually. Leak port 25 will be closed by pressure in chamber 81, moving rod 79 downwardly, stressing spring 56, and building up pressure in diaphragm chamber 14 to operate the valve 5, while branch pressure in chamber 82 holds hub 83 inactive. Movement of the valve stem 8 will be opposed by spring 17 until a balance is obtained. Hence, increase in branch pressure will move valve stem 8 downward, while a decrease in branch pressure will move the stem upward. Therefore, with switch 52 in "Winter" position, increase in branch pressure will close valve 5 and cut off the flow of heating medium (class 1 operation).

When the valve 52 is in dotted line or "Summer" position, that is during a cooling cycle (class 2 operation), main line pressure is established in line 87 and chambers 88 and 89. Pressure under diaphragm 86 holds rod 79 against the top of casing 58 to render it ineffective to control the leak port. The position of valve 26 will therefore be determined by the ratio of combined branch pressure in main chamber 82 and force of spring 56 to opposing supply pressure in chamber 89. Pilot spring 56 is preferably of such characteristics that when it is fully compressed by the closure of valve 5 it exerts slightly less force than that exerted by supply pressure from line 87 acting against diaphragm 84. Hence, valve stem 8 may move through its full stroke, and leak port 25 be closed when branch line 51 and chamber 82 are at atmospheric pressure.

The pilot valve action is therefore reversed solely by a movement of the valve 52 from one position to the other, and without altering the adjustments, settings, or any of the characteristics of the temperature controlling instrument or its equivalent, be it responsive to any atmospheric condition such as humidity, relative humidity, wet bulb temperature, dry bulb temperature, or the like. In the drawings, the control line 87 with its valve 52 is shown connected to a single pilot valve. Obviously this line can be used to control simultaneously the operation of a plurality of pilot valves so that their operating characteristics may be reversed simultaneously by movement of the single valve. When the device of the present invention is applied to the simultaneous control of several pilot valves, the line 87 controlled by valve 52 will be extended as indicated at 90, and each additional pilot valve will operate in the manner already described in connection with the pilot valve shown.

An alternative embodiment of the principles just described is shown in Fig. 2 in which the subscript $a$ is applied to parts corresponding to those of Fig. 1. The details of thermostat T are not illustrated since they are exactly as in Fig. 1. The modification consists in the use of a pilot valve employing two diaphragms and two leak ports, each of the leak port controls being connected to the valve operator by a follow-up connection similar to lever 71 of Fig. 1.

In Fig. 2 the pilot device V includes two leak ports 91 and 92, the lids of which are subject to control by the pressure in two diaphragm chambers 93 and 94. Here diaphragm chamber 93 controls leak port 91 for class 1 operation; hence it corresponds to chamber 81 of Fig. 1. Diaphragm chamber 94 controls leak port 92 for class 2 operation, and hence corresponds to chamber 82 of Fig. 1. A change-over valve 95 takes the place of valve 52 of Fig. 1. The parts are so arranged that with valve 95 in the position of Fig. 2, pressure from line 103 is vented through opening 97 in valve 95, pipe 96 is blanked, and branch line pressure in line 98 is supplied through pipe 99 to diaphragm chamber 93. Increase in pressure in this chamber closes the lid 101 of leak port 91 to build up pressure in line 102, and hence in diaphragm chamber 14a to close valve 5a. Since diaphragm chamber 94 is vented through line 103 and port 97 in valve 95, leak port 92 remains closed and valve 5a is controlled solely by leak port 91. A diaphragm loading spring 104 reacts between one end of lever 105 and the diaphragm of chamber 93. Lever 105 is adjustably connected to the valve stem 8a in a similar manner and performs the same follow-up function as lever 71 previously described in connection with Fig. 1.

Leak port 92 has a lid 106 biased to closed position by a spring 107 and adjustable by screw 108. The diaphragm of chamber 94 is loaded by spring 109 which engages follow-up lever 111. Lid 106 of leak port 92 is actuated by rod 112. The parts in Fig. 2 are in position to operate as a class 1 instrument in which increase in temperature increases branch line pressure, and pressure increase in chamber 14a moves the valve 5a in opposition to its spring bias.

Fig. 3 shows the change-over valve 95 positioned for reverse operation as in a class 2 instrument, that is, increase in branch line pressure from instrument T will cause movement of valve 5a in an opening direction, and in the direction of its spring bias. When the valve 95 is in the position of Fig. 3, main line pressure from line 96 is supplied to chamber 93, thereby holding leak port 91 closed. Branch line 98 is, however, connected to line 103 leading to diaphragm chamber 94 and controlling the pressure therein. Increase of pressure in this diaphragm chamber opens the lid 106 of leak port 92 to reduce the pressure in diaphragm chamber 14a and thus to permit spring 17a to open valve 5a. Through the follow-up connections 105 and 111 a balance will be obtained between valve movement and the movements of lids 101 and 106, respectively, so that the amount of movement of valve 5a is determined by the amount of venting accomplished by the particular leak port which is exercising control. As a class 1 instrument with the valve 95 in the position of Fig. 2, the control function is exercised by leak port 91, while lid 106 of leak port 92 is held closed by spring 107. As a class 2 instrument with the valve 95 in the position of Fig. 3, the control is exercised by leak port 92, while main line pressure in chamber 93 holds the lid 101 of leak port 91 closed.

The details of operation of the mechanism shown in Figs. 2 and 3 will be understood without further explanation. It presents the same advantages that have been set forth in connection with the apparatus of Fig. 1 with the added advantage of simplification. It indicates the generic nature of the present invention, only two embodiments of which are illustrated.

The principle of the present invention is not limited to the particular arrangement shown, but may be applied to other forms of fluid pressure responsive apparatus where it is desired to reverse the operating characteristics of one or more elements of the system from a central point without adjustment or alteration of the temperature responsive or equivalent responsive instrument. Consequently, the claims are to be construed broadly and without limitation to the particular type of apparatus shown.

What is claimed is:

1. In an automatic controlling system for a heat exchange medium and in which the parts are arranged to operate in either a heating or a cooling cycle; a non-reversible thermostatic means; a source of heat exchange medium; a valve for controlling the flow of such medium; a source of pressure fluid; a pressure motor for operating said valve; means comprising a leak valve responsive to conditions established by said thermostatic means for controlling the flow of fluid from said source to said motor; a follow-up connection between said leak valve and said medium control valve; and means acting on said leak valve to change the operation of the medium control valve from one cycle to the other.

2. In an automatic controlling system for a heat exchange medium and in which the parts are arranged to operate in either a heating or a cooling cycle; a non-reversible thermostatic means; a source of heat exchange medium; a valve for controlling the flow of such medium; a source of pressure fluid; a pressure motor for operating said valve; a leak valve for controlling the supply of fluid from said source to said motor; diaphragm means responsive to conditions established by said thermostatic means for controlling said leak valve; a follow-up connection between said leak valve and said medium control valve; and manually operable means for supplying pressure to and exhausting it from the diaphragm means to change the operating cycle of said medium control valve.

3. In an automatic controlling system for a heat exchange medium and in which the parts are arranged to operate in either a heating or a cooling cycle; a valve for the control of the medium; pressure responsive means for operating the valve; atmospheric condition responsive means for controlling the pressure responsive means; a pilot valve interposed between the atmospheric condition responsive means and the pressure responsive means; a follow-up connection between said medium control valve and said pilot valve; and means operating independently of the atmospheric condition responsive means for changing the response of said pilot valve from one cycle to the other.

4. In an automatic controlling system for a heat exchange medium and in which the parts are arranged to operate in either a heating or a cooling cycle; a valve for the control of the medium; pressure responsive means for operating the valve; atmospheric condition responsive means for controlling the pressure responsive means; a pilot valve including a leak port interposed between the atmospheric condition responsive means and the pressure responsive means; diaphragm means in said pilot valve for controlling said leak port in accordance with the operation of the atmospheric condition responsive means; and means including a follow-up connection between the medium control valve and the leak port controlling means for reversing the direction of response of said pilot valve to change the operation of the medium control valve from one cycle to the other.

5. In an automatic controlling system for a heat exchange medium in which the parts are arranged to operate in either a heating or a cooling cycle; a valve for the control of the medium; a pressure motor for operating the valve; atmospheric condition responsive means for controlling said pressure motor; a pilot valve interposed between said atmospheric condition responsive means and said pressure motor, said pilot valve including a leak port; and pressure responsive diaphragm means in said pilot valve for reversing the character of the responses of said leak port to pressure variation, to change the operation of the medium control valve from one cycle to the other.

6. In an automatic controlling system for a heat exchange medium in which the parts are arranged to operate in either a heating or a cooling cycle; a valve for the control of the medium; a pressure motor for operating the valve; atmospheric condition responsive means for controlling said pressure motor; a pilot valve interposed between said atmospheric condition responsive means and said pressure motor, said valve including leak port means; pressure responsive means comprising a plurality of diaphragms for controlling said leak port means; and means operable at will for applying pressure to certain of said diaphragms to reverse the direction of response of the leak port controlling means with respect to the atmospheric condition responsive means, to change the operation of the medium control valve from one cycle to the other.

7. In an automatic controlling system for a heat exchange medium in which the parts are arranged to operate in either a heating or a cooling cycle; a valve for the control of the medium; a pressure motor for operating the valve; atmospheric condition responsive means for controlling said pressure motor; a pilot valve interposed between said atmospheric condition responsive means and said pressure motor, said valve including leak port means; a first diaphragm means controlled by said atmospheric condition responsive means for controlling said leak port means during one of said cycles; a second diaphragm means controlled by said atmospheric condition responsive means for controlling said leak port means during the other of said cycles; and manually operable means for selectively rendering either of said diaphragm means ineffective.

8. In an automatic controlling system for a heat exchange medium and in which the parts are arranged to operate in either a heating or a cooling cycle; a valve for the control of the medium; pressure responsive means for operating the valve; atmospheric condition responsive means for controlling the pressure responsive means; a pilot valve interposed between the atmospheric condition responsive means and the pressure responsive means; a source of pressure fluid; leak port means in said pilot valve; a first diaphragm operated means in said pilot valve for controlling said leak port means in response to said atmospheric condition responsive means; and a second diaphragm operated means responsive to receipt of pressure fluid from said source for rendering said first diaphragm operated means ineffective.

9. In a system for regulating the flow of heat exchange medium, a source of medium; valve means for controlling the flow of said medium; means for biasing said valve means in one direction by an amount proportional to the extent of movement of the valve means; a source of pressure fluid; fluid pressure operated means for actuating the valve means in opposition to its bias; pilot valve means including a leak port arranged to be controlled by a regulating pressure; pressure regulating means responsive to an atmospheric condition and controlling the pilot valve means; follow-up mechanism for coordinating the movements of said medium control valve with the pilot valve means; and means for reversing the action of said pilot valve means relatively to said pressure regulating means.

10. In a system for regulating the flow of a heat exchange medium; a source of heat exchange medium; valve means for controlling the flow of said medium; means for biasing said valve means toward one limiting position by an amount proportional to its displacement therefrom; a pressure motor for opposing said biasing means; a source of pressure fluid connected with said pressure motor; pressure actuated pilot valve means for controlling said pressure motor, means responsive to changes in an atmospheric condition for controlling the pressure which controls said pilot valve means; follow-up mechanism for coordinating the movements of said medium control valve and said pilot valve means; and means for reversing the action of said means responsive to changes in atmospheric condition upon said pilot valve means.

OTTO SCHARPF.